United States Patent
Liu et al.

(10) Patent No.: US 11,451,356 B2
(45) Date of Patent: Sep. 20, 2022

(54) RESOURCE CONFIGURATION METHOD AND NODE

(71) Applicant: Huawei Technologies Co., Ltd., Shenzhen (CN)

(72) Inventors: Fengwei Liu, Chengdu (CN); Lei Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 30 days.

(21) Appl. No.: 17/077,772

(22) Filed: Oct. 22, 2020

(65) Prior Publication Data
US 2021/0044404 A1 Feb. 11, 2021

Related U.S. Application Data

(63) Continuation of application No. PCT/CN2019/082580, filed on Apr. 12, 2019.

(30) Foreign Application Priority Data

Apr. 24, 2018 (CN) .......................... 201810371458.6

(51) Int. Cl.
*H04L 5/00* (2006.01)
*H04B 7/06* (2006.01)
(Continued)

(52) U.S. Cl.
CPC ......... *H04L 5/0048* (2013.01); *H04B 7/0697* (2013.01); *H04L 5/0025* (2013.01);
(Continued)

(58) Field of Classification Search
CPC ... H04L 5/0048; H04L 5/0025; H04L 5/0062; H04B 7/0697; H04W 72/042;
(Continued)

(56) References Cited

U.S. PATENT DOCUMENTS

2008/0279145 A1* 11/2008 Boariu ............. H04W 72/1231
370/329
2012/0163335 A1* 6/2012 Chung ................. H04L 5/0037
370/330
(Continued)

FOREIGN PATENT DOCUMENTS

CN 102083210 A 6/2011
CN 102577286 A 7/2012
(Continued)

OTHER PUBLICATIONS

Huawei, HiSilicon, "Physical layer enhancement on IAB," 3GPP TSG RAN WG1 Meeting #92bis, Sanya, China, R1-1803695, total 6 pages, 3rd Generation Partnership Project, Valbonne, France (Apr. 16-20, 2018).

(Continued)

*Primary Examiner* — Kent Krueger

(74) *Attorney, Agent, or Firm* — Leydig, Voit & Mayer, Ltd.

(57) ABSTRACT

This application relates to the field of communications technologies, and discloses a resource configuration method and a node. The method includes: sending, by an parent node of a first node, first configuration information to the first node; and then determining, by the first node based on the first configuration information, a second resource for communication between the first node and a child node served by the first node. In this way, the determined second resource can implement orthogonalization between DMRS ports of an access link of the first node and a backhaul link of the first node, and therefore, link performance is improved.

20 Claims, 6 Drawing Sheets

(51) Int. Cl.
*H04W 72/04* (2009.01)
*H04W 84/04* (2009.01)
*H04W 72/08* (2009.01)

(52) U.S. Cl.
CPC ......... *H04L 5/0062* (2013.01); *H04W 72/042* (2013.01); *H04W 72/0433* (2013.01); *H04W 72/0446* (2013.01); *H04W 72/082* (2013.01); *H04W 84/047* (2013.01)

(58) Field of Classification Search
CPC ......... H04W 72/0433; H04W 72/0446; H04W 72/082; H04W 84/047
See application file for complete search history.

(56) References Cited

U.S. PATENT DOCUMENTS

| | | | |
|---|---|---|---|
| 2013/0064168 A1 | 3/2013 | Song et al. | |
| 2013/0064169 A1* | 3/2013 | Song | H04B 7/155 370/315 |
| 2018/0026684 A1* | 1/2018 | Wei | H04L 5/0007 370/329 |
| 2018/0367273 A1* | 12/2018 | Park | H04L 41/06 |
| 2019/0013916 A1* | 1/2019 | Jin | H04L 1/16 |
| 2019/0223024 A1* | 7/2019 | Mackenzie | H04L 5/0035 |

FOREIGN PATENT DOCUMENTS

| | | |
|---|---|---|
| CN | 102577293 A | 7/2012 |
| CN | 102577294 A | 7/2012 |
| CN | 103166880 A | 6/2013 |
| CN | 106470087 A | 3/2017 |
| CN | 107431682 A | 12/2017 |

OTHER PUBLICATIONS

Qualcomm Incorporated, "Enhancements to support NR backhaul links," 3GPP TSG RAN WG1 Meeting #92bis, Sanya, China, R1-1804835, total 9 pshrd, 3rd Generation Partnership Project, Valbonne, France (Apr. 16-20, 2018).

ETRI, Discussion on DMRS design for data channel. 3GPP TSG RAN WG1 Meeting #88bis, Spokane, USA, Apr. 3-7, 2017, R1-1704946, 7 pages.

Lenovo, Motorola Mobility, Remaining issues on DMRS 3GPP TSG RAN WG1 Meeting 90bis, Prague, CZ, 9th 13th, Oct. 2017, R1-1717853, 4 pages.

* cited by examiner

RESOURCE CONFIGURATION METHOD AND NODE

CROSS-REFERENCE TO RELATED APPLICATIONS

This application is a continuation of International Application No. PCT/CN2019/082580, filed on Apr. 12, 2019, which claims priority to Chinese Patent Application No. 201810371458.6, filed on Apr. 24, 2018. The disclosures of the aforementioned applications are hereby incorporated by reference in their entireties.

TECHNICAL FIELD

This application relates to the field of communications technologies, and in particular, to a resource configuration method and a node.

BACKGROUND

With continuous development of mobile communications technologies, spectrum resources have become extremely precious. Currently, spectrums that have not been allocated and that can be used for wireless communication are very limited. To improve spectrum utilization, base stations are deployed more densely in the future. Dense base station deployment requires a backhaul link of a base station to have a corresponding transmission capability. However, in many scenarios, for example, deployment costs of optical fibers are very high, thereby increasing deployment costs of future wireless base stations. Therefore, a wireless relay technology is used to well resolve a deployment problem of future dense base stations.

A relay node (RN) establishes a backhaul connection to a base station through a wireless link, so that optical fiber deployment costs of a common wired transceiver node are reduced. In-band relay is a relay solution in which a backhaul link and an access link of a same node share a same frequency band. Because no additional spectrum resource is used, the in-band relay has advantages such as high spectral efficiency and low deployment costs. The in-band relay usually has a half-duplex constraint. Specifically, when a relay node receives a downlink transmission sent by a parent node of the relay node, the relay node cannot send a downlink transmission to a child node of the relay node, and when the relay node receives an uplink transmission sent by the child node of the relay node, the relay node cannot send an uplink transmission to the parent node of the relay node.

Under the half-duplex constraint, the relay node may improve spectral efficiency by using a space division multiple access (SDMA) technology that is based on flexible duplex. Specifically, the relay node may perform downlink transmission to served user equipment or the child node on an access link of the relay node while performing uplink transmission on a backhaul link of the relay node, or may receive an uplink transmission on the access link of the relay node while receiving a downlink transmission on the backhaul link of the relay node. However, the SDMA technology that is based on the flexible duplex creates a more complex interference scenario while implementing spatial multiplexing, and there is a demodulation reference signal (DMRS) interference problem.

SUMMARY

In view of this, this application provides a resource configuration method and a node, to resolve a technical problem of DMRS signal interference existing in an in-band relay technology.

According to a first aspect, an embodiment of this application provides a resource configuration method. The method includes: A parent node of a first node, namely, a second node, sends first configuration information to the first node, and then the first node determines, based on the first configuration information, a second resource for communication between the first node and a child node served by the first node. The second resource herein refers to at least one DMRS port occupied by a first access link between the first node and the child node served by the first node, and the at least one DMRS port is a part of ports in a DMRS port set corresponding to a first slot.

In this way, the second node pre-allocates an available DMRS port to the first node, to implement semi-static DMRS port coordination, so that orthogonalization between DMRS ports of the access link and the backhaul link of the same node can be implemented, and therefore, link performance is improved.

Based on different content of the first configuration information, the first node may use different processing manners. In a possible design, the first configuration information may indicate a third resource that can be used by the first access link. In this way, the first node may select a part of or all resources from the third resource to communicate with user equipment. Because a DMRS port in the third resource is not occupied by the backhaul link, the orthogonalization between the DMRS ports of the access link and the backhaul link of the same node can be implemented, and interference between the links is avoided.

It should be noted that the third resource is a part of ports in the DMRS port set, and when the first node selects a part of resources from the third resource to communicate with the user equipment, the second resource is a subset of the third resource; or when the first node selects all resources from the third resource to communicate with the user equipment, the second resource is the third resource.

In another possible design, the first configuration information may indicate a fourth resource occupied by a backhaul link between the first node and the second node, and the first node may select, from the DMRS port set, a part of or all ports other than the fourth resource to communicate with user equipment. It should be noted that the fourth resource is also a part of ports in the DMRS port set. Because a DMRS port in the fourth resource is already occupied by the backhaul link, the first node selects, from the DMRS port set, the part of or all the ports other than the fourth resource to communicate with the user equipment, to implement the orthogonalization between the DMRS ports of the access link and the backhaul link of the same node and avoid interference between the links.

In a possible design, the first slot is any one of slots that are used for spatial multiplexing and that are configured for the backhaul link between the first node and the second node, and the slots used for spatial multiplexing is one or more slots in which data sending or receiving can be simultaneously performed on a backhaul link and an access link of the same node. Specifically, a fixed configuration periodicity may be set for the backhaul link. For example, one configuration periodicity includes 10 slots, and a part of slots used for spatial multiplexing may be set in the 10 slots. In this way, the access link and the backhaul link of the same node can share the slot, to implement spatial multiplexing. Because the foregoing resource configuration method is specific to the slots used for spatial multiplexing, a problem of interference caused by an SDMA technology that is based on flexible duplex is resolved when in-band relay is implemented.

Usually, position information of the first slot may be notified to the first node by using the first configuration information, or may be notified to the first node by using another configuration message. This is not specifically limited in this embodiment of this application.

It is not difficult to understand that the first slot may be configured based on a request of the first node. For example, the first node sends a request message to the second node, where the request message is used to request to allocate the slots used for spatial multiplexing. Then, the first node receives the first configuration information sent by the second node, and includes indication information of the first slot in the first configuration information.

In another possible design, the first configuration information includes at least one of the following information: parameter information of the first slot, DMRS configuration type information of the first slot, a code division multiplexing (CDM) group identifier, or an orthogonal cover code (OCC) identifier. The parameter information of the first slot may be an index number of the first slot, a subcarrier spacing of the first slot, or the like. The DMRS configuration type information of the first slot is usually a configuration type 1, a configuration type 2, or the like. Because resource configuration of the DMRS port is highly flexible, in this application, the second node delivers information such as an identifier or an index number of the DMRS port to the first node, and the first node may accurately determine the DMRS port occupied by the backhaul link or the DMRS port that is not occupied by the backhaul link. Therefore, a DMRS port orthogonal to the DMRS port occupied by the backhaul link can be selected.

According to a second aspect, an embodiment of this application provides a resource configuration method. The method includes: A second node sends first configuration information to a first node, where the first configuration information is used by the first node to determine, based on the first configuration information, a second resource for communication between the first node and a child node served by the first node. The second resource is at least one DMRS port that can be occupied by a first access link between the first node and the child node served by the first node. Herein, the at least one DMRS port is a part of ports in a DMRS port set corresponding to a first slot.

In this way, the second node notifies, by using the first configuration information, the first node of an available DMRS port or an already-used DMRS port, and the first node can determine an orthogonal DMRS port, to implement semi-static DMRS port coordination, so that orthogonalization between DMRS ports of the access link and the backhaul link of the same node can be implemented, and therefore, link performance is improved.

The first configuration information may indicate a third resource, or may indicate a fourth resource. The first configuration information may include parameter information of the first slot, DMRS configuration type information of the first slot, and the like. The first slot is any one of slots used for spatial multiplexing. For specific content, refer to the descriptions in the method example according to the first aspect, and details are not described herein again.

According to a third aspect, an embodiment of this application provides a first node. The first node includes:

a receiving unit, configured to receive first configuration information sent by a second node; and a processing unit, configured to determine, based on the first configuration information, a second resource for communication between the first node and a child node served by the first node.

The second resource is at least one demodulation reference signal DMRS port that can be occupied by a first access link, the at least one DMRS port is a part of ports in a DMRS port set corresponding to a first slot, the first access link is a link between the first node and the child node served by the first node, and the second node is an parent node of the first node.

In this way, the first node can determine, by receiving the first configuration information, an available DMRS port or an already-used DMRS port, and determine an orthogonal DMRS port, so that orthogonalization between DMRS ports of the access link and the backhaul link of the same node can be implemented, and therefore, link performance is improved.

In a possible design, the first configuration information is used to indicate a third resource that can be used by the first access link, the third resource is a part of ports in the DMRS port set, and the second resource is all or a part of resources of the third resource. Because a DMRS port in the third resource is not occupied by a backhaul link, the orthogonalization between the DMRS ports of the access link and the backhaul link of the same node can be implemented, and interference between the links is avoided.

In a possible design, the first configuration information is used to indicate a fourth resource occupied by a backhaul link between the first node and the second node, the fourth resource is a part of ports in the DMRS port set, and the second resource is all or a part of ports, other than the fourth resource, in the DMRS port set. Because a DMRS port in the fourth resource is already occupied by the backhaul link, the first node selects, from the DMRS port set, the part of or all the ports other than the fourth resource to communicate with user equipment, to implement the orthogonalization between the DMRS ports of the access link and the backhaul link of the same node and avoid interference between the links.

In a possible design, the first slot is any one of slots that are used for spatial multiplexing and that are configured by the second node for the backhaul link between the first node and the second node, and the slots used for spatial multiplexing is one or more slots in which data sending or receiving can be simultaneously performed on a backhaul link and an access link of a same node. Because the foregoing resource configuration method is specific to the slots used for spatial multiplexing, a problem of interference caused by an SDMA technology that is based on flexible duplex is resolved when in-band relay is implemented.

In a possible design, the first configuration information includes at least one of the following information: parameter information of the first slot, DMRS configuration type information of the first slot, a code division multiplexing CDM group identifier, or an orthogonal cover code OCC identifier. Because resource configuration of the DMRS port is highly flexible, in this application, the second node delivers information such as an identifier or an index number of the DMRS port to the first node, and the first node may accurately determine the DMRS port occupied by the backhaul link or the DMRS port that is not occupied by the backhaul link. Therefore, a DMRS port orthogonal to the DMRS port occupied by the backhaul link can be selected.

According to a fourth aspect, an embodiment of this application provides a second node. The second node includes:

a processing unit, configured to determine first configuration information, where the first configuration information is used by a first node to determine, based on the first configuration information, a second resource for communication between the first node and a child node served by the first node, the second resource is at least one demodulation reference signal DMRS port that can be occupied by a first access link, the at least one DMRS port is a part of ports in a DMRS port set corresponding to a first slot, and the first access link is a link between the first node and the child node served by the first node; and a sending unit, configured to send the first configuration information to the first node.

In a possible design, the first configuration information is used to indicate a third resource that is not occupied by a backhaul link between the first node and the second node, the third resource is a part of ports in the DMRS port set, and the second resource is all or a part of resources of the third resource. Because a DMRS port in the third resource is not occupied by the backhaul link, orthogonalization between DMRS ports of the access link and the backhaul link of the same node can be implemented, and interference between the links is avoided.

In a possible design, the first configuration information is used to indicate a fourth resource that can be used by the first access link, the fourth resource is a part of ports in the DMRS port set, and the second resource is all or a part of ports, other than the fourth resource, in the DMRS port set. Because a DMRS port in the fourth resource is already occupied by the backhaul link, the first node selects, from the DMRS port set, the part of or all the ports other than the fourth resource to communicate with user equipment, to implement orthogonalization between DMRS ports of the access link and the backhaul link of the same node and avoid interference between the links.

In a possible design, the first slot is any one of slots that are used for spatial multiplexing and that are configured by the second node for the backhaul link between the first node and the second node, and the slots used for spatial multiplexing is one or more slots in which data sending or receiving can be simultaneously performed on a backhaul link and an access link of a same node. Because the foregoing resource configuration method is specific to the slots used for spatial multiplexing, a problem of interference caused by an SDMA technology that is based on flexible duplex is resolved when in-band relay is implemented.

In a possible design, the first configuration information includes at least one of the following information: parameter information of the first slot, DMRS configuration type information of the first slot, a code division multiplexing CDM group identifier, or an orthogonal cover code OCC identifier. Because resource configuration of the DMRS port is highly flexible, in this application, the second node delivers information such as an identifier or an index number of the DMRS port to the first node, and the first node may accurately determine the DMRS port occupied by the backhaul link or the DMRS port that is not occupied by the backhaul link. Therefore, a DMRS port orthogonal to the DMRS port occupied by the backhaul link can be selected.

According to a fifth aspect, an embodiment of this application provides a communications apparatus. The communications apparatus includes a transceiver, a memory, and a processor, and the memory is configured to store program code that needs to be executed by the processor. The transceiver is configured to perform data receiving and sending between the apparatus and another apparatus (for example, a first node or a second node). The processor is configured to execute the program code stored in the memory, is specifically applied to the first node or the second node, and is configured to perform the method according to any design of any one of the first aspect or the second aspect.

According to a sixth aspect, an embodiment of this application further provides a communications system. The communications system includes: a first node and a second node, where the second node is a parent node of the first node; the second node is configured to: determine first configuration information, and send the first configuration information to the first node; and the first node is configured to determine, based on the received first configuration information, a second resource for communication between the first node and a child node served by the first node. In this way, a problem of interference caused by an SDMA technology that is based on flexible duplex is resolved when in-band relay is implemented.

In a possible design, the first configuration information is used to indicate a third resource that can be used by a first access link, the third resource is a part of ports in a DMRS port set, and the second resource is all or a part of resources of the third resource. Because a DMRS port in the third resource is not occupied by a backhaul link, orthogonalization between DMRS ports of the access link and the backhaul link of the same node can be implemented, and interference between the links is avoided.

In a possible design, the first configuration information is used to indicate a fourth resource occupied by a backhaul link between the first node and the second node, the fourth resource is a part of ports in a DMRS port set, and the second resource is all or a part of ports, other than the fourth resource, in the DMRS port set. Because a DMRS port in the fourth resource is already occupied by the backhaul link, the first node selects, from the DMRS port set, the part of or all the ports other than the fourth resource to communicate with user equipment, to implement orthogonalization between DMRS ports of the access link and the backhaul link of the same node and avoid interference between the links.

In a possible design, the first slot is any one of slots that are used for spatial multiplexing and that are configured by the second node for the backhaul link between the first node and the second node, and the slots used for spatial multiplexing is one or more slots in which data sending or receiving can be simultaneously performed on a backhaul link and an access link of a same node. Because the foregoing resource configuration method is specific to the slots used for spatial multiplexing, a problem of interference caused by an SDMA technology that is based on flexible duplex is resolved when in-band relay is implemented.

In a possible design, the first configuration information includes at least one of the following information: parameter information of the first slot, DMRS configuration type information of the first slot, a code division multiplexing CDM group identifier, or an orthogonal cover code OCC identifier. Because resource configuration of the DMRS port is highly flexible, in this application, the second node delivers information such as an identifier or an index number of the DMRS port to the first node, and the first node may accurately determine the DMRS port occupied by the backhaul link or the DMRS port that is not occupied by the backhaul link. Therefore, a DMRS port orthogonal to the DMRS port occupied by the backhaul link can be selected.

According to a seventh aspect, an embodiment of this application provides a node. The node specifically includes a communications apparatus in the fifth aspect, and is configured to perform the method according to any design of any one of the first aspect or the second aspect.

According to an eighth aspect, an embodiment of this application further provides a computer-readable storage medium. The computer-readable storage medium is configured to store a computer software instruction used for performing a function according to any one of the first aspect, the second aspect, or any design of the first aspect or the second aspect. The computer software instruction includes a program designed for performing any one of the first aspect, the second aspect, or any design of the first aspect or the second aspect.

According to a ninth aspect, an embodiment of this application provides a computer program product including an instruction. When the computer program product is run on a computer, the computer is enabled to perform the method according to any one of the first aspect, the second aspect, or any design of the first aspect or the second aspect.

According to a tenth aspect, an embodiment of this application provides a chip. The chip is connected to a memory, and is configured to read and execute a software program stored in the memory, to implement the method according to any one of the first aspect, the second aspect, or any design of the first aspect or the second aspect.

According to an eleventh aspect, an embodiment of this application provides a chip. The chip includes a processor and a memory, and the processor is configured to read a software program stored in the memory, to implement the method according to any one of the first aspect, the second aspect, or any design of the first aspect or the second aspect.

According to the resource configuration method provided in embodiments of this application, the second node sends the first configuration information to the first node, so that the first node can determine, by using the first configuration information, the DMRS port that can be used to communicate with the child node. Because the determined DMRS port and the port that is used by the backhaul link of the first node can implement DMRS port orthogonalization, DMRS interference is avoided, and link performance is improved.

DESCRIPTION OF EMBODIMENTS

The following further describes this application in detail with reference to the accompanying drawings.

The resource configuration method provided in this application may be applied to a relay system. The relay system may use a system architecture shown in FIG. 1. A node 1 (a host node) does not directly send a signal to a node 4 (user equipment). Instead, the node 1 first sends a signal to a node 2 (a relay node), the node 2 forwards the signal to a node 3 (a relay node), and then the node 3 forwards the signal to the node 4 (the user equipment). The relay system in this embodiment of this application may be a single-hop relay system, or may be a multi-hop relay system. A single-hop relay system forwards a signal through only one relay node, and a multi-hop relay system may forward a signal through a plurality of relay nodes. The relay system in this embodiment of this application may be various types of communications systems, for example, may be a long term evolution (LTE) system, may be a 5th generation mobile networks or 5th generation wireless systems (5G), or may be a hybrid LTE/5G architecture.

In the relay system, the host node provides a service for a child node of the host node. It should be noted that the child node herein is the relay node, and the child node of the host node may be one relay node, or may be a plurality of relay nodes. The host node may be a common base station, for example, a NodeB or an evolved NodeB (eNB), a new radio controller (NR controller), a next generation base station (gNB) in a 5G system, a centralized network element (centralized unit), a new radio base station, a remote radio unit, a micro base station, a distributed network element (distributed unit), a reception point (TRP), a transmission point (TP), or any other radio access device. This is not limited in this embodiment of this application.

Figure 1:
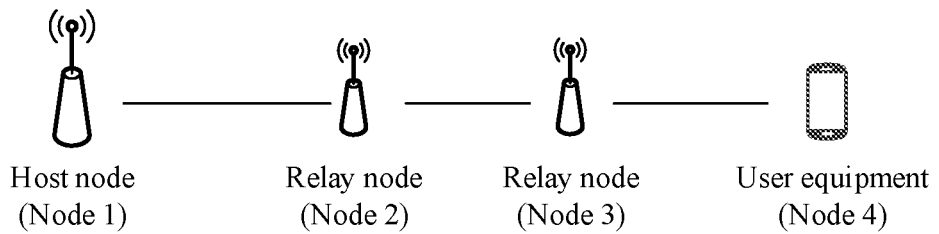
FIG. 1 is an architectural diagram of a relay system according to an embodiment of this application.

The relay node is a network device, and provides a service, such as data connection, for a child node of the relay node through an access link. It should be noted that the child node herein may be the user equipment, or may be another relay node. Different from a common network device, the relay node may connect to a parent node of the relay node through a backhaul link. It should be noted that the parent node herein may be the host node, or may be another relay node. For example, the relay node may be an RN in an LTE network. In new radio (NR), a relay node may be named as a relay transmission reception point (rTRP), an integrated access and backhaul (IAB) node, or the like. In addition, in some scenarios, the user equipment may also be used as a relay node. With reference to FIG. 1, a node (for example, the node 1) that provides a resource of a backhaul link may usually refer to as a parent node of a relay node (for example, the node 2), and the node 3 may be referred to as a child node of the node 2. Usually, a child node may be considered as user equipment of a parent node. It should be understood that, in the relay system shown in FIG. 1, one relay node may be connected to one parent node. However, in a future relay system, to improve reliability of a backhaul link, one relay node may have a plurality of parent nodes that provide services for the relay node.

It should be understood that names of all nodes and messages in this application are merely names set for ease of description in this application, and may be different names in an actual network. It should not be understood as that names of various nodes and messages are limited in this application. On the contrary, any name that has a same or similar function as that of a node or a message used in this application may be considered as a method or an equivalent replacement in this application, and is within the protection scope of this application. Details are not described below.

To facilitate understanding, the following describes some nouns in this application.

(1) User equipment (UE) may be a device that provides a user with voice and/or data connectivity, for example, a handheld device or vehicle-mounted device having a wireless connection function. Common user equipment includes, for example, a mobile phone, a tablet computer, a notebook computer, a palmtop computer, a mobile internet device (MID), and a wearable device. The wearable device includes, for example, a smart watch, a smart band, and a pedometer.

(2) A node refers to a network device, for example, may be a base station. The base station may be also referred to as a radio access network (RAN) device, and may be a device that enables user equipment to access a wireless network. The network device includes but may not limit to: an eNB, a radio network controller (RNC), a gNB, a base station controller (base station controller, BSC), a base transceiver station (BTS), a home base station (HNB), a baseband unit (BBU), a TRP, an rTRP, and a TP. In addition, the network device may further includes an access point (AP) and the like.

(3) A time unit in this application may be a slot or a mini-slot, a transmission time interval (TTI), a subframe, or a symbol.

(4) Uplink transmission in this application means that user equipment transmits data or a signal to a parent node (for example, a relay node or a host node), or may be that a child node transmits data or a signal to a parent node. Downlink transmission in this application means that a parent node (for example, a relay node or a host node) transmits data or a signal to a child node, where the child node may be a relay node or user equipment.

(5) In a relay system in this application, a backhaul link may be a link between a relay node and a parent node of the relay node, and an access link may be a link between a relay node and a child node of the relay node, or a link between a relay node and user equipment, or a link between a base station/host node and user equipment served by the base station/host node. The backhaul link and the access link are viewed from a perspective of different network elements. For example, for a parent node, a link that provides data transmission for user equipment or a relay node served by the parent node may be referred to as an access link; from a perspective of a child node (for example, a relay node), a link between the relay node and a parent node of the relay node may be referred to as a backhaul link.

Figure 2:
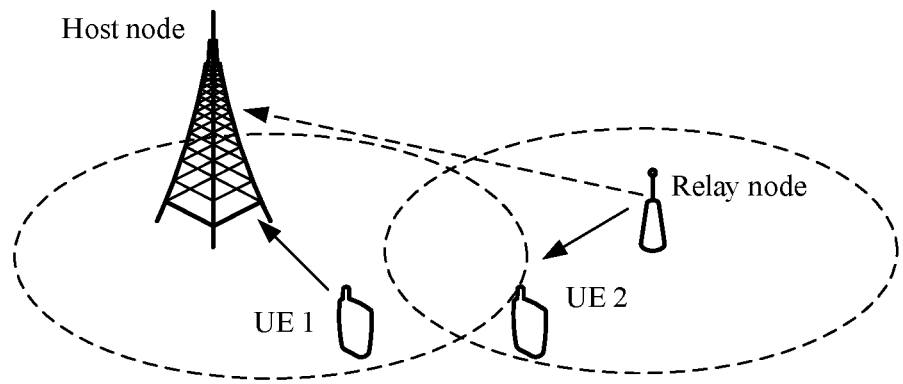
FIG. 2 is a schematic diagram of uplink interference in an SDMA technology according to an embodiment of this application.

The relay system to which the resource configuration method provided in this application may be applicable uses an in-band relay technology, and in-band relay has a half-duplex constraint. In other words, when a relay node receives downlink data sent by a parent node of the relay node, the relay node cannot send downlink data to a child node of the relay node, and when the relay node receives uplink data sent by the child node of the relay node, the relay node cannot send uplink data to the parent node of the relay node. Under the half-duplex constraint, the relay node may improve spectral efficiency by using a space division multiple access (SDMA) technology that is based on flexible duplex. A specific implementation is: The relay node may send downlink data to the child node served by the relay node on an access link of the relay node while performing uplink transmission on a backhaul link of the relay node. The child node may be a relay node or UE. As shown in FIG. 2, a relay node sends downlink data to UE 2 on an access link of the relay node while performing uplink transmission to a host node on a backhaul link of the relay node.

Figure 3:
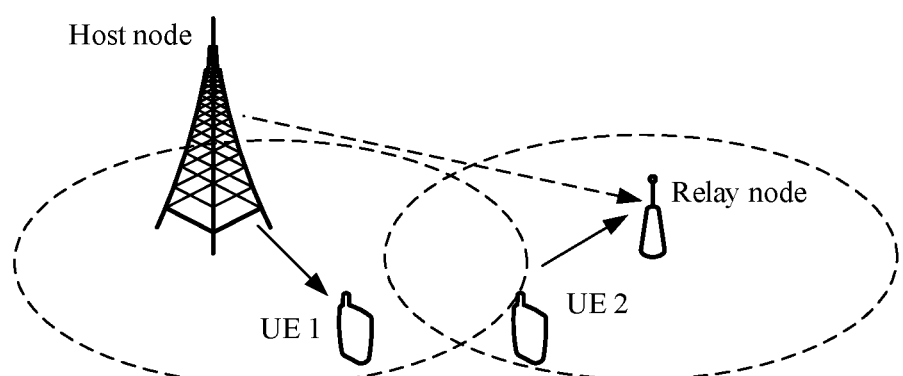
FIG. 3 is a schematic diagram of downlink interference in an SDMA technology according to an embodiment of this application.

Alternatively, the relay node receives an uplink transmission from the child node of the relay node on the access link of the relay node while performing downlink receiving on the backhaul link of the relay node. The child node of the relay node may be a relay node or UE. As shown in FIG. 3, a relay node receives uplink data from UE 2 on an access link of the relay node while receiving downlink data from a host node on a backhaul link of the relay node.

In a scenario, shown in FIG. 2, in which the relay node performs downlink transmission on the access link of the relay node while performing uplink transmission on the backhaul link of the relay node, the following factors are mainly considered.

(1) A parent node of the relay node schedules both UE 1 and the relay node that are in a cell served by the parent node, but orthogonalization between DMRS ports used when the UE 1 and the relay node simultaneously send uplink data may be implemented, so that no interference occurs at this time.

(2) The UE 1 and the UE 2 are located in different cells, and the different cells have different DMRS initialization parameters. Therefore, link interference between the different cells in FIG. 2 is random interference.

(3) The downlink transmission performed by the relay node to the UE 2 on the access link of the relay node causes interference to the uplink transmission performed by the relay node on the backhaul link of the relay node. Because the relay node simultaneously performs data transmission on the backhaul link and the access link, mutual interference occurs between the access link and the backhaul link of the relay node. A main cause of the interference is: Although the downlink transmission performed by the relay node on the access link of the relay node is transmission to the UE 2 served by the relay node, energy of the downlink transmission may still be leaked to the host node, especially when isolation between a beam used by the relay node to transmit data to the UE 2 and a beam used to transmit data to the parent node (for example, a donor base station) on the backhaul link may be insufficient. Generally, the access link and the backhaul link of the relay node use different DMRS sequences, to implement DMRS randomization. However, the backhaul link usually requires a relatively high signal to interference plus noise ratio (SINR), and interference generated by a randomized DMRS may cause a case in which the backhaul link cannot meet a communications performance requirement.

In a scenario, shown in FIG. 3, in which the relay node receives an uplink transmission on the access link of the relay node while performing downlink receiving on the backhaul link of the relay node, the following factors are mainly considered.

(1) Because the host node schedules both UE 1 and the relay node, and the host node may be usually a parent node of the relay node, orthogonalization between DMRSs separately sent by the host node to the relay node and the UE 1 may be implemented. Therefore, in this case, no interference occurs between the backhaul link of the relay node and the access link of the relay node.

(2) The UE 1 and the UE 2 are located in different cells, and the different cells have different DMRS initialization parameters. Therefore, link interference between the different cells in FIG. 3 is random interference.

(3) Uplink transmission performed by the UE 2 on the access link of the relay node causes interference to downlink transmission performed by the relay node on the backhaul link of the relay node. However, when the relay node simultaneously receives a downlink transmission of the backhaul link and the uplink transmission from the UE 2, regardless of a position of the UE 2, interference may occur between the backhaul link and the access link of the relay node. Because the relay node simultaneously performs data transmission on the backhaul link and the access link, mutual interference occurs between the access link and the backhaul link of the relay node. A main cause of the interference is: The access link and the backhaul link of the relay node use different DMRS sequences, to implement DMRS randomization. However, the backhaul link usually requires a relatively high signal to interference plus noise ratio (SINR), and interference generated by a randomized DMRS may cause a case in which the backhaul link cannot meet a communications performance requirement.

It should be noted that, although in the examples of FIG. 2 and FIG. 3, the parent node of the relay node is the host node, the parent node of the relay node may alternatively be another relay node. In addition, although in the examples of FIG. 2 and FIG. 3, the child node of the relay node is the UE, the child node of the relay node may alternatively be another relay node. This is not enumerated one by one herein.

It can be learned from the two scenarios shown in FIG. 2 and FIG. 3 that the relay system implemented by using the in-band relay technology needs to focus on resolving a problem of interference between an access link and a backhaul link of a same node. Theoretically, when the parent node of the relay node, for example, the host node, schedules the relay node on the backhaul link, the relay node may determine scheduling of the access link of the relay node after receiving uplink or downlink scheduling information of the host node, to simply implement DMRS port orthogonalization. However, it may be not feasible to avoid DMRS interference randomization through relay scheduling because the following problems mainly exist: (1) After receiving scheduling information from the parent node on the backhaul link, the relay node may not have enough time (or have no transmission opportunity) to schedule the child node; (2) Scheduling of the host node may occupy all DMRS ports in a shared slot, so that no DMRS port is available for the relay node.

For the foregoing problem, this application provides a resource configuration method. Specifically, an parent node of a first node, namely, a second node, first sends first configuration information to the first node, the second node may correspond to the host node in the foregoing description or may be another relay node, and the first node corresponds to one relay node in the child nodes of the host node in the foregoing description. Because the first configuration information indicates DMRS ports that can be used by the first node in a first slot and that is of an access link of the first node, or the first configuration information indicates DMRS ports occupied by the first node and the second node to perform data transmission on a backhaul link, the first node may determine, based on the first configuration information, a second resource for communication between the first node and a child node served by the first node. It should be noted that, for ease of description in this application, all DMRS ports that can be used for the backhaul link and the access link of the first node in the first slot are referred to as a DMRS port set, and a link between the first node and the child node served by the first node may be referred to as a first access link. The second resource refers to one or more DMRS ports occupied by the first access link, and the second resource may be a part of ports in the DMRS port set corresponding to the first slot. After such resource configuration, orthogonalization between DMRS ports used by the access link and the backhaul link that is between the first node and the second node is implemented, and therefore, DMRS signal interference may be avoided.

The DMRS signal interference may be usually interference caused by non-orthogonalization between DMRS ports of the backhaul link and the access link of the first node in a time unit, for example, in a slot or a subframe. The first slot may be a time unit in which the first node performs spatial multiplexing. To be specific, the first node simultaneously receives data on the backhaul link and the access link, or the first node simultaneously sends data on the access link and the backhaul link. It should be understood that the first slot may be a time unit. Although the first slot is used as an example in this embodiment, it should not be understood as that the method in this application is limited to only one slot, and on the contrary, this application may include a resource configuration method for a plurality of slots. Because the resource configuration method is specific to a slot used for spatial multiplexing, a problem of interference caused by an SDMA technology that is based on flexible duplex is resolved when in-band relay is implemented.

Further, for ease of description, in this application, one or more DMRS ports that are indicated by the first configuration information and that can be used by the first access link of the first node are referred to as a third resource. In other words, one or more DMRS ports that are not occupied by the backhaul link of the first node and that are not occupied by data are referred to as the third resource. The third resource may be a part of the DMRS port set, to be specific, the one or more DMRS ports included in the third resource are also a part of the DMRS port set. When the first configuration information includes the third resource, the first node selects the second resource from the third resource to communicate with the child node of the first node. When the selected second resource is a part of the third resource, the second resource may be a subset of the third resource. When the selected second resource is all resources of the third resource, the second resource is the third resource. Because a DMRS port in the third resource is not occupied by the backhaul link, orthogonalization between DMRS ports of the access link and the backhaul link of the same node can be implemented, and interference between the links is avoided.

Similarly, for ease of description, in this application, one or more DMRS ports occupied by the backhaul link between the first node and the second node are referred to as a fourth resource, and the fourth resource may be a part of the DMRS port set. It should be noted that there is no intersection between the third resource and the fourth resource in the first slot. When the first configuration information includes the fourth resource, the first node selects, from the DMRS port set corresponding to the first slot, all or a part of resources other than the fourth resource to communicate with user equipment. It should be noted that the first slot is usually a slot that may be used for spatial multiplexing and that may be preconfigured before the second node sends the first configuration information, or the slot used for spatial multiplexing may be configured at the same time when the first configuration information is configured. The slot used for spatial multiplexing may be a slot in which data sending or receiving can be simultaneously performed on a backhaul link and an access link of a same node. Because a DMRS port in the fourth resource may be already occupied by the backhaul link, the first node selects, from the DMRS port set, the part of or all the ports other than the fourth resource to communicate with the user equipment, to implement orthogonalization between DMRS ports of the access link and the backhaul link of the same node and avoid interference between the links.

Considering that there are a plurality of resource mapping manners of the DMRS port, the first configuration information in this embodiment of this application may include at least one of the following information: parameter information of the first slot, DMRS configuration type information of the first slot, a code division multiplexing (CDM) group identifier, or an orthogonal cover code (OCC) identifier. The parameter information of the first slot may include a time domain position of the first slot, for example, a slot index number of the first slot, or the parameter information of the first slot may include a subcarrier spacing of the first slot or the like. The DMRS configuration type information of the first slot may be a configuration type 1, a configuration type 2, or the like.

Specifically, in a manner 1, the first configuration information may be a number of a DMRS port occupied by the backhaul link in a slot whose index number is 1, or a number of a DMRS port available for the access link in a slot whose index number is 1. For example, when DMRS ports occupies a single symbol in time domain, and four DMRS ports may be multiplexed on the single symbol. The first configuration information may indicate that a first port and a second port in the slot are DMRS ports available for the access link. In a manner 2, the first configuration information may be a DMRS configuration type in a slot whose index number is 1 and a CDM group identifier occupied by the backhaul link in the slot, or a DMRS configuration type in a slot whose index number is 1 and a CDM group identifier available for the access link. In a manner 3, the first configuration information may alternatively be a DMRS configuration type in a slot whose index number is 1, and an orthogonal cover code (OCC) identifier and a CDM group identifier that are occupied by the backhaul link in the slot, or may be a DMRS configuration type in a slot whose index number is 1, and an OCC identifier and a CDM group identifier that are available for the access link in the slot. In a manner 4, the first configuration information may alternatively be a DMRS configuration type in a slot whose index number is 1 and an OCC identifier occupied by the backhaul link in the slot, or may be a DMRS configuration type in a slot whose index number is 1 and an OCC identifier available for the access link in the slot. Because resource configuration of the DMRS port is highly flexible, in this application, the second node delivers information such as an OCC identifier, a CDM group identifier, or an index number of the DMRS port to the first node, and the first node may accurately determine the DMRS port occupied by the backhaul link or the DMRS port that is not occupied by the backhaul link. Therefore, a DMRS port orthogonal to the DMRS port occupied by the backhaul link can be selected.

It should be noted that, in the foregoing example, only the slot index number is used to indicate the time domain position of the first slot. Actually, the time domain position of the first slot may alternatively include periodicity information of the first slot, and the index number indicates a time domain position of the first slot in one periodicity. The periodicity may be a default periodicity, for example, half a radio frame, one radio frame, or 20 slots. The periodicity may alternatively be indicated by the first configuration information or other configuration information.

In a possible implementation, the DMRS port available for the access link may be notified by using a zero power DMRS. To be specific, the second node notifies the first node that DMRSs corresponding to several DMRS ports are zero power DMRSs, and after receiving the notification, the first node may use the ports corresponding to the zero power DMRSs for transmission on the access link.

For resource mapping of different DMRS ports, the following briefly describes a DMRS configuration type, a CDM group identifier, and an OCC identifier based on an NR DMRS resource mapping manner.

Figure 7:
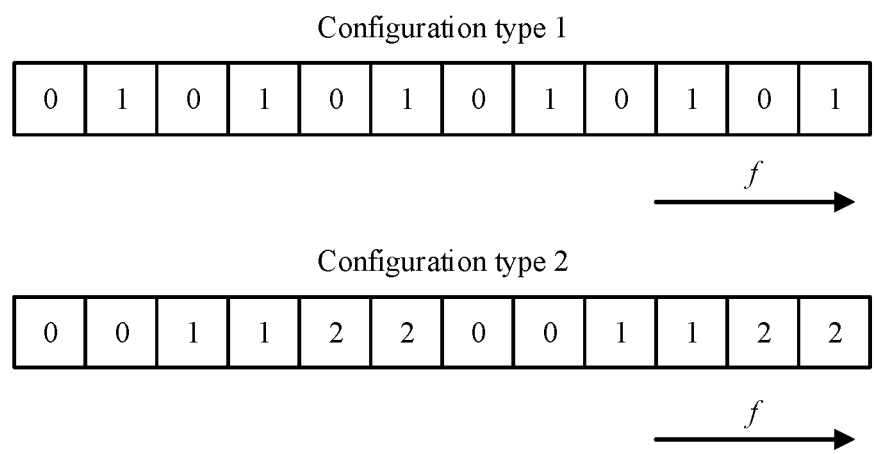
FIG. 7 is a schematic diagram of resource mapping of a DMRS frequency domain pattern according to an embodiment of this application.

The NR DMRS resource mapping manner may be highly flexible. For example, a frequency domain pattern of a DMRS has two configurations: a configuration type 1 and a configuration type 2, as shown in FIG. 7. It should be noted that FIG. 7 shows only a DMRS frequency domain pattern in one resource block (RB), and a same frequency domain pattern may be extended to show a case of a plurality of RBs.

DMRS configuration type 1: For a one-symbol DMRS design, to be specific, DMRS port(s) occupies/occupy one symbol in time domain, resource elements (RE) in the symbol may be divided, based on frequency domain positions, into two groups, namely, a set of REs marked as 0 and a set of REs marked as 1 in the DMRS configuration type 1 in FIG. 7. Each group of REs are arranged in a comb shape in frequency domain. In a protocol, the two groups of REs are separately referred to as a code division multiplexing group 0 (CDM group 0) and a code division multiplexing group 1 (CDM group 1). In the protocol of a current stage, each CDM group may multiplex two DMRS ports through code division multiplexing. Therefore, four DMRS ports, for example, ports 1000, 1001, 1002, and 1003 may be multiplexed in one RB. DMRS ports belonging to different CDM groups are orthogonalized through frequency division multiplexing, and DMRS ports belonging to a same CDM group are orthogonalized through (frequency domain) code division multiplexing.

DMRS configuration type 2 (DMRS configuration type 2): For a one-symbol DMRS design, REs in a symbol may be divided, based on frequency domain positions, into three groups, namely, a set of REs marked as 0, a set of REs marked as 1, and a set of REs marked as 2 in the DMRS configuration type 2 in FIG. 7. The three groups of REs are adjacent to each other in frequency domain. In the protocol, the three groups of REs are separately referred to as a code division multiplexing group 0 (CDM group 0), a code division multiplexing group 1 (CDM group 1), and a code division multiplexing group 2 (CDM group 2). In the protocol of the current stage, each CDM group may multiplex two DMRS ports through code division multiplexing. Therefore, six DMRS ports, separately marked as ports 1000, 1001, 1002, 1003, 1004, and 1005 may be multiplexed in one RB. DMRS ports belonging to different CDM groups are orthogonalized through frequency division multiplexing, and DMRS ports belonging to a same CDM group are orthogonalized through (frequency domain) code division multiplexing.

Further, for a two-symbol DMRS design, to be specific, DMRS portsoccupy two symbols in time domain, when one DMRS port occupies one or more subcarriers on two consecutive time domain symbols, time domain OCCs $\{1, 1\}$ and $\{1, -1\}$ may be further introduced. A quantity of orthogonal ports can be doubled by using an OCC on two consecutive DMRS symbols in time domain. For example, for the DMRS configuration type 1, a quantity of available DMRS ports may be increased to 8 by using the time domain OCC, and for the DMRS configuration type 2, a quantity of available ports may be increased to 12 by using the time domain OCC.

It should be noted that the one-symbol DMRS design or the two-symbol DMRS design refers to a quantity of consecutive front-loaded DMRS symbols in one slot, and does not include an additional DMRS. The additional DMRS may usually be a DMRS added to make channel estimation more accurate for a high-speed or high doppler frequency offset scenario. In this application, the first configuration information may be applicable to an NR front-loaded DMRS, and may be also applicable to a case of a front-loaded DMRS plus an additional DMRS.

In a possible implementation, DMRS configuration of RRC includes configuration of a maximum quantity of DMRS symbols. In the existing protocol, the maximum quantity of DMRS symbols may be 1 or 2. Under a constraint of the maximum quantity of DMRS symbols, a base station determines a specific quantity of DMRS symbols based on DCI. When the maximum quantity of DMRS symbols is 1, the base station always schedules one DMRS symbol. When the maximum quantity of DMRS symbols is 2, the base station may schedule one or two DMRS symbols. To make DMRSs orthogonalized in a spatial multiplexing scenario, the backhaul link and the access link need to have a same type of DMRS symbol. Therefore, the first configuration information may further include information about a quantity of DMRS symbols occupied by the first slot.

Figure 4:
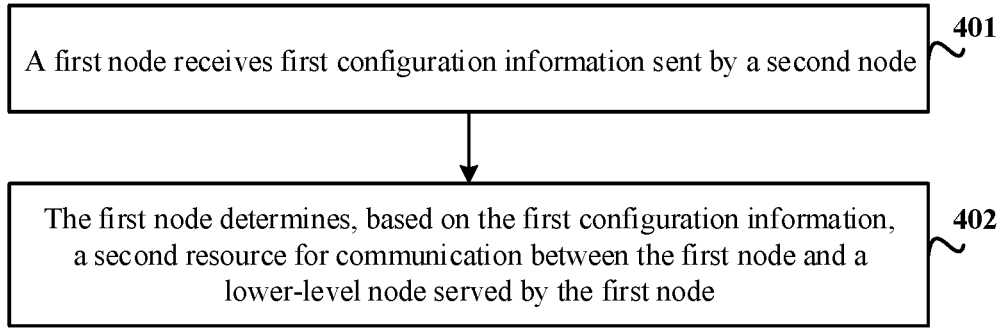
FIG. 4 is a schematic flowchart of a resource configuration method according to an embodiment of this application.
Figure 5:
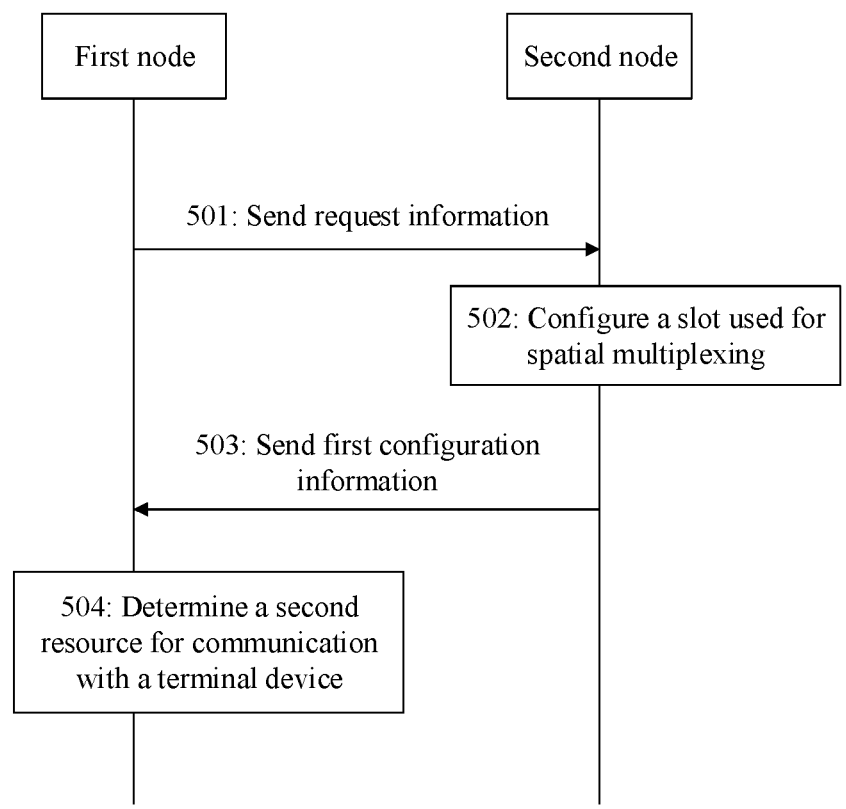
FIG. 5 is a schematic diagram of interaction between a first node and a second node according to an embodiment of this application.

To describe the resource configuration method in more detail, an embodiment of this application further describes the method with reference to FIG. 4 and FIG. 5. In FIG. 4, the following steps are specifically included.

Step 401: A second node sends first configuration information to a first node.

Step 402: The first node determines, based on the first configuration information, a second resource for communication between the first node and a child node served by the first node.

In other words, a host node sends first configuration information to a relay node in advance, and indicates, in the first configuration information, DMRS port(s) that can be used by the first node and that is of an access link or DMRS port(s) occupied by the first node and the second node to perform data transmission on a backhaul link of the first node. In other words, the first configuration information indicates a third resource or a fourth resource. The relay node determines a second resource based on the first configuration information, and when scheduling for a first slot is performed, selects an available DMRS port from the second resource for transmission on the access link. In this way, semi-static DMRS port coordination may be implemented, so that orthogonalization between DMRS ports of the access link and the backhaul link may be implemented, and therefore, link performance may be improved.

In this embodiment of this application, when step 401 is performed, the second node needs to determine a slot used for spatial multiplexing. The first slot may be one of determined slots used for spatial multiplexing. In other words, the first node simultaneously receives, in the first slot, a downlink transmission on the backhaul link and an uplink transmission on the access link, or the first node simultaneously sends, in the first slot, a downlink transmission on the access link and an uplink transmission on the backhaul link. As shown in FIG. 5, the resource configuration method is relatively systematically described with reference to a process in which a second node determines a slot used for spatial multiplexing and a process of configuring a resource corresponding to a DMRS port. Specific steps are as follows:

Step 501: A first node sends request information to the second node, where the request information may be used to request one or more slots for performing transmission on an access link of the first node, in other words, request a slot used for spatial multiplexing.

Figure 6:
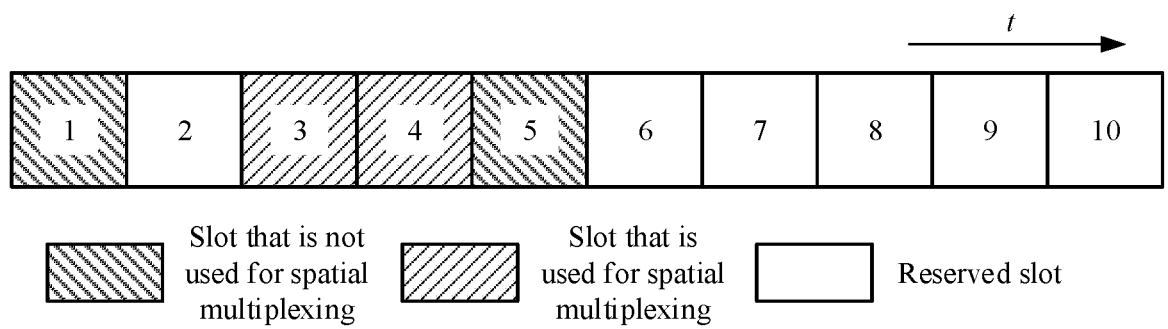
FIG. 6 is a schematic diagram of resource mapping of slots used for spatial multiplexing according to an embodiment of this application.

Specifically, for example, the request information may include a quantity of and positions of required slots used for spatial multiplexing. As shown in FIG. 6, one backhaul link configuration periodicity includes 10 slots, and the first, the third, the fourth, and the fifth slots are slots configured for performing transmission on a backhaul link of the first node. The first node may request to use the third slot and the fourth slot to perform transmission on the access link of the first node, or request to configure the third slot and the fourth slot as slots used for spatial multiplexing.

Step 502: The second node determines, for the first node based on the request information, a slot used for spatial multiplexing, and a third resource or a fourth resource in each slot used for spatial multiplexing.

As shown in FIG. 6, after receiving the request information from the first node, the second node configures the third slot and the fourth slot as the slots used for spatial multiplexing, to be specific, the first node may simultaneously perform transmission on the access link and the backhaul link of the first node in the third slot and the fourth slot, and configure a third resource or a fourth resource for each of the third slot and the fourth slot.

Step 503: After determining the slot used for spatial multiplexing and the third resource or the fourth resource in each slot used for spatial multiplexing, the second node sends, to the first node by using first configuration information, the determined slot used for spatial multiplexing, and the determined third resource or the determined fourth resource in each slot used for spatial multiplexing. It should be understood that the slots used for spatial multiplexing and the third resource or the fourth resource in each slot used for spatial multiplexing may be sent to the first node in different messages, or may be sent to the first node in a same message. This is not limited in this application.

Specifically, for a first slot (corresponding to FIG. 6, the first slot may be the third slot or the fourth slot) in the slots that is used for spatial multiplexing and that are allocated by the second node, it is assumed that a plurality of DMRS ports configured for the first slot form a DMRS port set, and before uplink or downlink scheduling, the second node pre-allocates, for the first node from the DMRS port set, one ore more DMRS ports that can be used by the access link of the first node; or before uplink or downlink scheduling, the second node restricts one or more DMRS ports, in the DMRS port set, occupied by the second node on the backhaul link of the first node, and then sends, to the first node by using the first configuration information, the allocated DMRS ports that can be used by the access link of the first node or the DMRS ports, in the DMRS port set, occupied by the second node on the backhaul link of the first node.

Step 504: The first node determines, based on the received first configuration information, a second resource for communication between the first node and a child node served by the first node.

If the first configuration information includes a third resource, the second resource may be all or a part of resources of the third resource. In other words, the second resource may be one or more DMRS ports that are in the first slot and that may be occupied by the first node and the child node of the first node to perform data transmission on the access link. It is assumed that the first configuration information includes a fourth resource, in this way, the second resource may be all or a part of DMRS ports, other than the fourth resource, in the DMRS port set.

In this embodiment of this application, before performing uplink or downlink scheduling on the backhaul link, the second node may configure the first configuration information for the first node by using radio resource control (RRC) signaling, or may send the first configuration information by using media access control element (MAC CE) signaling. In addition, the first configuration information may alternatively be sent by using other higher layer signaling. This is not limited in this application.

It should be understood that the foregoing is merely an example. In some cases, the first node does not need to send the request information to the second node. When the first node accesses the second node, the second node identifies that the first node is a relay node, and automatically configures the first configuration information for the first node. Therefore, in this case, step 501 is not mandatory. However, in some other cases, the second node dynamically changes, based on an amount of data that needs to be transmitted by the first node, the slots used for spatial multiplexing as well as the third resource or the fourth resource in each slot used for spatial multiplexing. All these should be possible implementations that can be figured out by a person of ordinary skill in the art, and shall fall within the protection scope of this application.

Specifically, in this embodiment, a DMRS configuration type 1 for a one-symbol DMRS design is used as an example for description. When performing uplink or downlink scheduling on an access link of the second node, the second node (for example, a host node) allocates one or more DMRS ports to UE or the first node served by the second node. However, when a DMRS port scheduled by the second node for the backhaul link between the first node and the second node does not occupy all CDM groups in a scheduled slot used for spatial multiplexing, a remaining CDM group in the slot may be used for data transmission, or may be set to zero. According to an existing protocol, before the UE or the relay node receives uplink or downlink scheduling information from the second node, the UE or the relay node cannot know the configured DMRS port, and cannot know whether the unoccupied CDM group schedules the data. In this embodiment of this application, when the DMRS configuration type 1 is used, and only a one-symbol DMRS is allocated, the second node may notify, by using the first configuration information, the first node of DMRS ports, for example, {1000, 1001}, that can be used on the first access link of the first node for the slot used for spatial multiplexing. In a subsequent slot used for spatial multiplexing, each DMRS port used by the first node for scheduling on the access link of the first node is from {1000, 1001}. The DMRS ports {1000, 1001} may be notified by using a CDM group. For example, it is directly notified that the DMRS ports {1000, 1001} correspond to a CDM group 0. When two DMRS symbols are used and a time domain OCC is configured, the DMRS ports {1000, 1001} may alternatively be notified to the relay node by using first configuration information carrying a CDM group identifier and an OCC identifier, or may be notified to the relay node by using first configuration information carrying a CDM group identifier. After the DMRS ports {1000, 1001} used for data transmission on the access link of the first node are notified, a port in the DMRS ports {1000, 1001} is definitely not occupied by the backhaul link. At the same time, the first node and the second node also need to agree that data is not transmitted on a resource occupied by the ports in the DMRS ports {1000, 1001}.

In conclusion, the host node sends the first configuration information to the relay node in advance, and indicates, in the first configuration information, a DMRS port available for the access link or a DMRS port that is already occupied by the backhaul link, and the relay node selects, based on the first configuration information, one or more available DMRS ports to communicate with the child node, to implement semi-static DMRS port coordination, so that orthogonalization between DMRS ports of the access link and the backhaul link can be implemented, and therefore, link performance may be improved.

Figure 8:
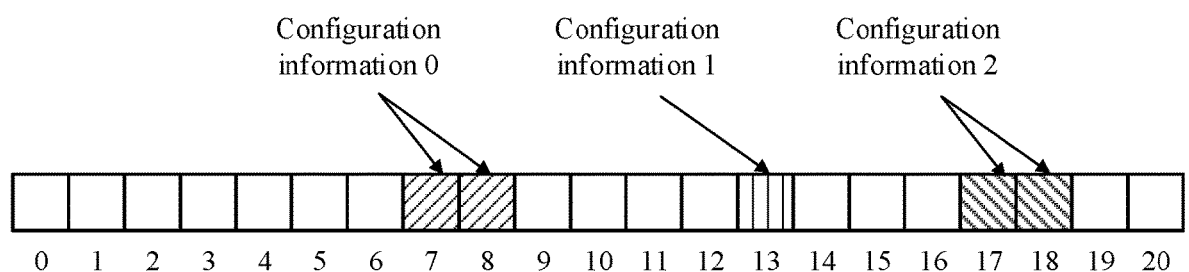
FIG. 8 is a schematic diagram of configuration information of a frame structure according to an embodiment of this application.

In a possible implementation, the second node sends a plurality of configuration messages to the first node, and different configuration messages correspond to different slots used for spatial multiplexing. For example, FIG. 8 is a schematic diagram of 20 consecutive slots. Configuration information 0 corresponds to a slot 7 and a slot 8, configuration information 1 corresponds to a slot 13, and configuration information 2 corresponds to a slot 17 and a slot 18. In other words, the slot 7, the slot 8, the slot 13, the slot 17 and the slot 18 are configured as backhaul resource. In this way, the second node performs DMRS ports configuration for these slots for which the backhaul link is configured, and sends a configuration result to the first node by using the configuration information 0, the configuration information 1, and the configuration information 2. Then the first node determines, based on the configuration information, one or more DMRS ports corresponding to the access link of the first node, for example, determines one or more DMRS ports occupied by the access link in the slot 7 and slot 8 that correspond to the configuration information 0. Certainly, the second node may alternatively send configurations of a plurality of slots in a same configuration message, for example, configuration information of a plurality of slots configured in one periodicity. For example, one periodicity may be configuration information of one or more slots that are used for spatial multiplexing and that are configured in one radio frame (for example, 10 milliseconds). A length of the periodicity may not be a restriction in this application, and the periodicity may be for example two or four radio frames, and the periodicity comprises a start position of the configured slots. FIG. 8 is merely an example, and should not be understood as a limitation on configuration of a plurality of slots used for spatial multiplexing.

Figure 9:
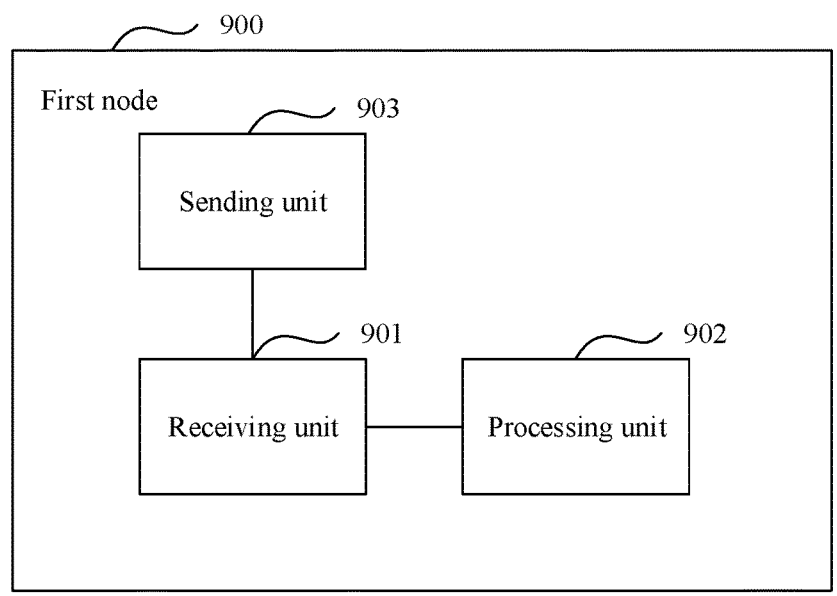
FIG. 9 is a schematic structural diagram of a first node according to an embodiment of this application.

For the foregoing method procedure, this application provides a first node. For specific execution content, refer to the method steps performed by the first node. FIG. 9 is a schematic structural diagram of a first node 900 according to this application. The first node 900 includes a receiving unit 901 and a processing unit 902.

The receiving unit 901 is configured to receive first configuration information sent by a second node.

The processing unit 902 determines, based on the first configuration information received by the receiving unit 901, a second resource for communication between the first node and a child node served by the first node.

The second resource herein refers to at least one DMRS port occupied by a access link between the first node and the child node served by the first node, and the at least one DMRS port is a part of ports in a DMRS port set corresponding to a first slot.

In this way, the second node pre-allocates an available DMRS port to the first node, to implement semi-static DMRS port coordination, so that orthogonalization between DMRS ports of the access link and the backhaul link of the same node can be implemented, and therefore, link performance may be improved.

In a possible implementation, the first node further includes a sending unit 903, configured to send request information to the second node, where the request information may be used to request one or more slots for performing transmission on the access link of the first node, in other words, request a slot used for spatial multiplexing. Then, the second node determines, for the first node based on the request information, the slot used for spatial multiplexing and a third resource or a fourth resource in each slot used for spatial multiplexing.

In a possible implementation, the first configuration information may indicate a third resource that can be used by the access link. In this way, the processing unit 902 may select, from the third resource indicated by the first configuration information, a part of or all resources to communicate with the child node.

In another possible implementation, the first configuration information may indicate a fourth resource occupied by a backhaul link. In this way, the processing unit 902 may select, from the DMRS port set, a part of or all resources other than the fourth resource to communicate with user equipment.

In this embodiment of this application, in a possible design, the first slot may be any one of slots that are used for spatial multiplexing and that are configured for the backhaul link. Specifically, a fixed configuration periodicity may be set for the backhaul link. For example, one configuration periodicity includes 10 slots, and a part of slots used for spatial multiplexing may be set in the 10 slots. In this way, the access link and the backhaul link of the same node can share the slot, to implement spatial multiplexing.

In this embodiment of this application, there are a plurality of configuration types in a DMRS resource mapping manner, and the first configuration information may include at least one of the following information: parameter information of the first slot, DMRS configuration type information of the first slot, a CDM group identifier, or an OCC identifier. The parameter information of the first slot may be an index number of the first slot, a subcarrier spacing of the first slot, or the like. The DMRS configuration type information of the first slot may usually be a configuration type 1, a configuration type 2, or the like.

It should be noted that the first node may be configured to perform the steps of the resource configuration method shown in FIG. 4. For an implementation and technical effects that are not described in detail in this embodiment of the resource configuration apparatus, refer to related descriptions in the embodiment of the resource configuration method shown in FIG. 4.

It should be noted that, in this embodiment of this application, module division is an example, and is merely logical function division. During actual implementation, another division manner may be used. Function modules in this embodiment of this application may be integrated into one processing module, or each of the modules may exist alone physically, or two or more modules may be integrated into one module. The integrated module may be implemented in a form of hardware, or may be implemented in a form of a software function module.

When the integrated module is implemented in the form of a software function module and sold or used as an independent product, the integrated module may be stored in a computer-readable storage medium. Based on such an understanding, the technical solutions of this application essentially, or the part contributing to the prior art, or all or some of the technical solutions may be implemented in a form of a software product. The software product is stored in a storage medium and includes several instructions for instructing a computer device (which may be a personal computer, a server, or a network device) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

Based on a same inventive concept, an embodiment of this application further provides a communications apparatus. The communications apparatus may be applied to a first node, and may be configured to perform the steps performed by the first node in the resource configuration method shown in FIG. 4.

Figure 10:
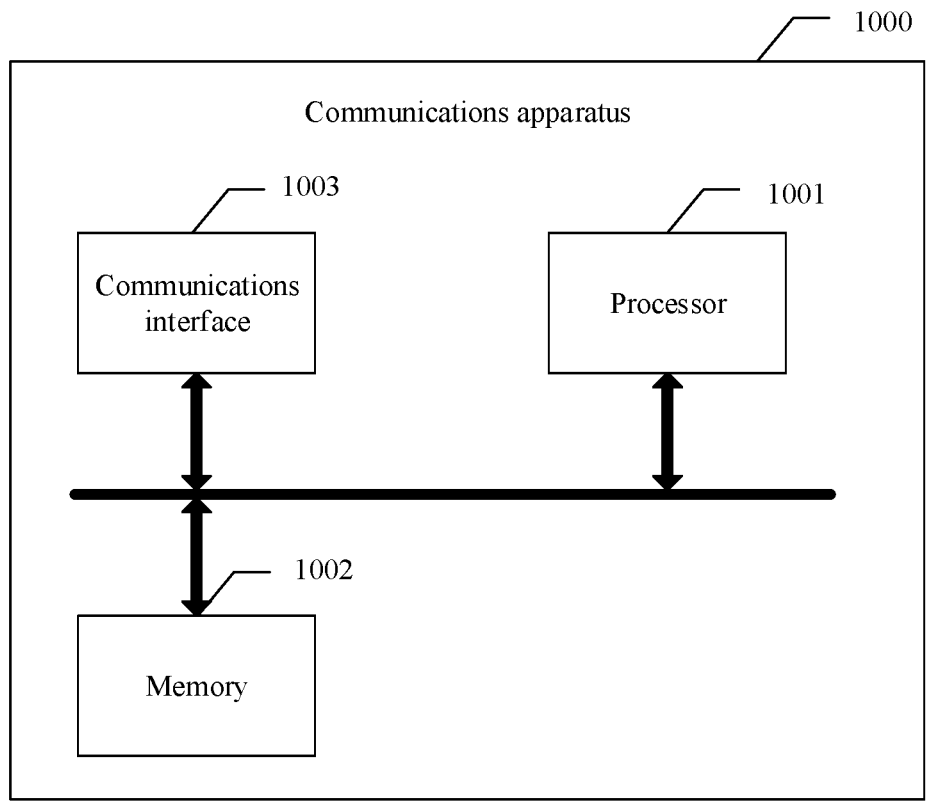
FIG. 10 is a schematic structural diagram of a communications apparatus according to an embodiment of this application.

Referring to FIG. 10, in hardware implementation, the receiving unit 901 may be a receiver, the processing unit 902 may be a processor, the sending unit 903 may be a transmitter, and the receiver and the transmitter may constitute a communications interface.

A processor 1001 in the communications apparatus 1000 may be configured to implement a function of the first node in the resource configuration method according to the embodiments of this application. The communications apparatus 1000 may exchange information with another device through a communications interface 1003. The communications apparatus 1000 may further include a memory 1002, configured to store a program instruction and/or data. The memory 1002 may be coupled to the processor 1001. The processor 1001 may cooperate with the memory 1002. The processor 1001 may execute the program instruction stored in the memory 1002. The memory 1002 may be included in the processor 1001. For example, the processor 1001 may be configured to determine, based on first configuration information, a second resource for communication between a first node and a child node served by the first node. If the first configuration information includes a third resource, a second resource may be all or a part of resources of the third resource. If the first configuration information includes a fourth resource, the second resource may be all or a part of DMRS ports, other than the fourth resource, in a DMRS port set.

The processor 1001 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a digital signal processor and a microprocessor.

The communications interface 1003 may be a circuit, a bus, a transceiver, or any other apparatus that may be configured to perform information exchange. For example, the communications apparatus may be a base station, UE, or a relay node. The processor 1001 may receive and send data through the communications interface 1003. For example, the communications interface 1003 may be configured for data receiving and sending between the communications apparatus and a second node. Specifically, the communications interface 1003 may be configured to: receive the first configuration information sent by the second node, where the first configuration information indicates the third resource or the fourth resource; and send request information to the second node before receiving the first configuration information, where the request information may be used to request a slot used for spatial multiplexing and a third resource or a fourth resource in each slot used for spatial multiplexing.

In this embodiment of this application, a specific connection medium between the communications interface 1003, the processor 1001, and the memory 1002 is not limited. In this embodiment of this application, in FIG. 10, the memory 1002, the processor 1001, and the communications interface 1003 are connected through a bus. The bus is indicated by using a thick line in FIG. 10. A connection manner between other components is merely an example for description, and is not limited thereto. The bus may be classified into an address bus, a data bus, a control bus, and the like. For ease of representation, only one thick line is used to represent the bus in FIG. 10, but this does not mean that there is only one bus or only one type of bus.

An embodiment of this application further provides a chip. The chip includes the communications interface and the processor, and may be configured to support the apparatus 1000 in implementing any steps performed by the first node in the method described in the embodiment of FIG. 4.

An embodiment of this application further provides a computer-readable storage medium. The computer-readable storage medium may be configured to store a computer software instruction that needs to be executed by the processor, and the computer software instruction includes a program that needs to be executed by the processor.

Figure 11:
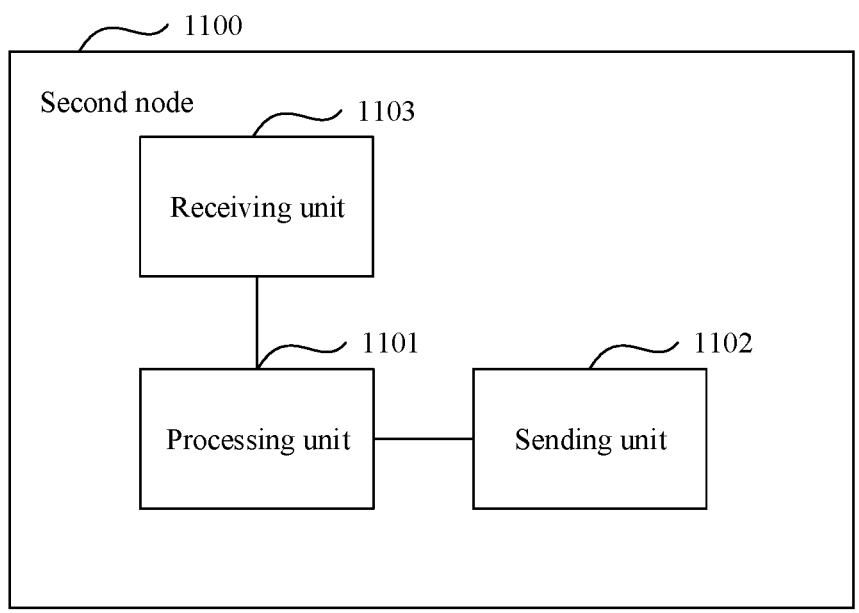
FIG. 11 is a schematic structural diagram of another resource configuration apparatus according to an embodiment of this application.

Based on a same inventive concept, this application further provides a second node. For specific execution content, refer to the foregoing method steps performed by the second node. FIG. 11 is a schematic structural diagram of another resource configuration apparatus 1100 according to this application. The resource configuration apparatus 1100 includes a processing unit 1101 and a sending unit 1102.

The processing unit 1101 may be configured to determine first configuration information, where the first configuration information may be used by a first node to determine a second resource for communication between the first node and a child node served by the first node.

The sending unit 1102 may be configured to send the first configuration information to the first node.

In a possible design, the apparatus further includes a receiving unit 1103.

The receiving unit 1103 may be configured to receive request information sent by the first node. The request information may be used to request a slot for transmitting an access link of the first node, in other words, request a slot used for spatial multiplexing. Then, the processing unit 1101 determines, for the first node based on the request information, the slot used for spatial multiplexing and a third resource or a fourth resource in each slot used for spatial multiplexing, and includes a determining result in the first configuration information.

Specifically, the second resource may be at least one DMRS port that can be occupied by a first access link between the first node and the child node served by the first node. Herein, the at least one DMRS port may be a part of ports in a DMRS port set corresponding to a first slot.

The first configuration information may indicate a third resource, or may indicate a fourth resource. The first configuration information may include parameter information of the first slot, DMRS configuration type information of the first slot, and the like. The first slot may be any one of slots used for spatial multiplexing. For specific content, refer to the descriptions in the method example.

It should also be noted that the second node may be configured to perform the steps performed by the second node in the resource configuration method shown in FIG. 5. For an implementation and technical effects that are not described in detail in this embodiment of the resource configuration apparatus, refer to related descriptions in the embodiment of the resource configuration method shown in FIG. 5. Details are not described herein again.

It should be noted that, in this embodiment of this application, unit division is an example, and is merely logical function division. During actual implementation, another division manner may be used. Function units in this embodiment of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The software product may be stored in a storage medium and includes several instructions for instructing a computer device (which may be a personal computer, a server, or a network device) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

Based on a same inventive concept, an embodiment of this application further provides a communications apparatus. The communications apparatus may be configured to perform the steps performed by the second node in the resource configuration method shown in FIG. 5.

Figure 12:
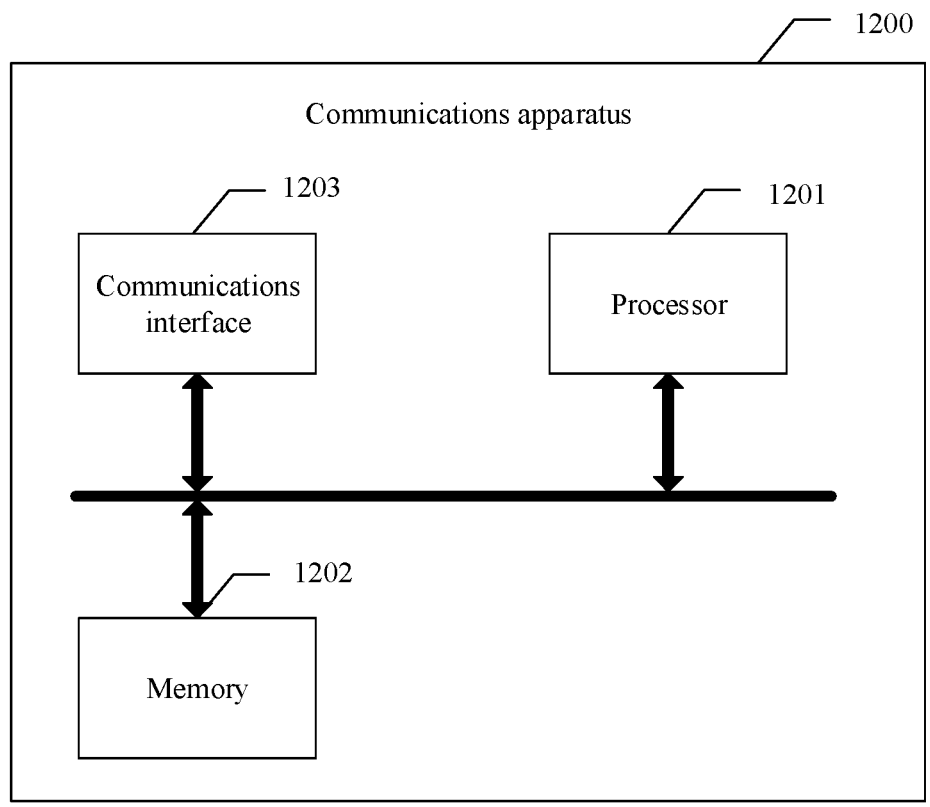
FIG. 12 is a schematic structural diagram of a second node according to an embodiment of this application.

Referring to FIG. 12, in hardware implementation, the receiving unit 1103 may be a receiver, the processing unit 1101 may be a processor, the sending unit 1102 may be a transmitter, and the receiver and the transmitter may constitute a communications interface.

The communications apparatus 1200 includes a processor 1201, configured to implement a function of the second node in the resource configuration method according to the embodiments of this application. The communications apparatus 1200 may further include a memory 1202, configured to store a program instruction and/or data. The memory 1202 may be coupled to the processor 1201. The processor 1201 may cooperate with the memory 1202. The processor 1201 may execute the program instruction stored in the memory 1202. The memory 1202 may be included in the processor 1201. For example, the processor 1201 may be configured to: configure, for a first node based on request information sent by the first node, a slot used for spatial multiplexing and a third resource or a fourth resource in each slot used for spatial multiplexing, and generate first configuration information including a determining result. It should be noted that the configuration result of configuring, by the second node, the slot used for spatial multiplexing and information about the third resource or the fourth resource in each slot used for spatial multiplexing may be delivered to the first node in a same piece of configuration information, or may be delivered in different pieces of configuration information. This is not limited in this application.

The processor 1201 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a digital signal processor and a microprocessor.

The communications apparatus 1200 may further include a communications interface 1203, and the apparatus 1200 may exchange information with another device through the communications interface 1203. The communications interface 1203 may be a circuit, a bus, a transceiver, or any other apparatus that may be configured to perform information exchange. For example, the another device may be a base station, UE, or a relay node. The processor 1201 may receive and send data through the communications interface 1203. For example, the communications interface 1203 may be configured for data receiving and sending between the communications apparatus and the first node. Specifically, the communications interface 1203 may be configured to: send the first configuration information to the first node, where the first configuration information indicates a third resource or a fourth resource; and receive, before sending the first configuration information, the request information sent by the first node.

In this embodiment of this application, a specific connection medium between the communications interface 1203, the processor 1201, and the memory 1202 is not limited. In this embodiment of this application, in FIG. 12, the memory 1202, the processor 1201, and the communications interface 1203 are connected through a bus. The bus is indicated by using a thick line in FIG. 12. A connection manner between other components is merely an example for description, and is not limited thereto. The bus may be classified into an address bus, a data bus, a control bus, and the like. For ease of representation, only one thick line is used to represent the bus in FIG. 12, but this does not mean that there is only one bus or only one type of bus.

An embodiment of this application further provides a chip. The chip includes the communications interface and the processor, and may be configured to support the communications apparatus 1200 in implementing any steps performed by the second node in the method described in the embodiment of FIG. 5.

An embodiment of this application further provides a computer-readable storage medium. The computer-readable storage medium may be configured to store a computer software instruction that needs to be executed by the processor, and the computer software instruction includes a program that needs to be executed by the processor.

Figure 13:
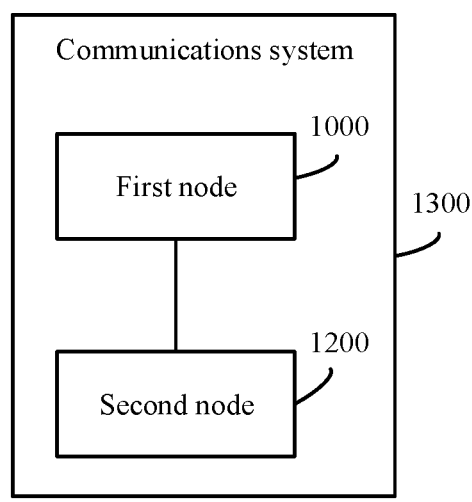
FIG. 13 is a schematic structural diagram of a communications system according to an embodiment of this application.

In addition, an embodiment of this application further provides a communications system. As shown in FIG. 13, the communications system 1300 includes the communications apparatus 1000 and the communications apparatus 1200.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may alternatively be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto the computer or the another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

Clearly, a person skilled in the art can make various modifications and variations to this application without departing from the spirit and scope of this application. This application is intended to cover these modifications and variations of this application provided that they fall within the scope of protection defined by the following claims and their equivalent technologies.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present disclosure are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A resource configuration method, comprising:
receiving, by a first node, first configuration information sent by a second node, wherein the second node is a parent node of the first node; and
determining, by the first node based on the first configuration information, a second resource for communication between the first node and a child node served by the first node, wherein the second resource is at least one demodulation reference signal (DMRS) port occupied by a first access link, the at least one DMRS port is one of a plurality of ports in a DMRS port set corresponding to a first slot, and the first access link is a link between the first node and the child node served by the first node,
wherein the first node uses a space division multiple access (SDMA) technology that is based on flexible duplex.

2. The method according to claim 1, wherein the first configuration information is used to indicate a third resource that can be used by the first access link, the third resource is one of the plurality of ports in the DMRS port set, and the second resource is all or a part of resources of the third resource.

3. The method according to claim 1, wherein the first configuration information is used to indicate a fourth resource occupied by a backhaul link between the first node and the second node, the fourth resource is one of the plurality of ports in the DMRS port set, and the second resource is one or more or all of the plurality of ports, other than the fourth resource, in the DMRS port set.

4. The method according to claim 1, wherein the first slot is one of a plurality of slots that are used for spatial multiplexing and that are configured by the second node for a backhaul link between the first node and the second node, and a slot used for spatial multiplexing is one of the plurality of slots in which data sending or receiving can be simultaneously performed on a backhaul link and an access link of a same node.

5. The method according to claim 1, wherein the first configuration information comprises at least one of the following information: parameter information of the first slot, DMRS configuration type information of the first slot, a code division multiplexing (CDM) group identifier, or an orthogonal cover code (OCC) identifier.

6. A resource configuration method, comprising:
determining, by a second node, first configuration information, wherein the first configuration information is used by a first node to determine, based on the first configuration information, a second resource for communication between the first node and a child node served by the first node, the second resource is at least one demodulation reference signal (DMRS) port that can be occupied by a first access link, the at least one DMRS port is one of a plurality of ports in a DMRS port set corresponding to a first slot, and the first access link is a link between the first node and the child node served by the first node; and
sending, by the second node, the first configuration information to the first node,
wherein the first node uses a space division multiple access (SDMA) technology that is based on flexible duplex.

7. The method according to claim 6, wherein the first configuration information is used to indicate a third resource that is not occupied by a backhaul link between the first node and the second node, the third resource is one of the plurality of ports in the DMRS port set, and the second resource is all or a part of resources of the third resource.

8. The method according to claim 6, wherein the first configuration information is used to indicate a fourth resource that can be used by the first access link, the fourth resource is one of the plurality of ports in the DMRS port set, and the second resource is one or more or all of the plurality of ports, other than the fourth resource, in the DMRS port set.

9. The method according to claim 6, wherein the first slot is one of a plurality of slots that are used for spatial multiplexing and that are configured by the second node for a backhaul link between the first node and the second node, and a slot used for spatial multiplexing is one of the plurality of slots in which data sending or receiving can be simultaneously performed on a backhaul link and an access link of a same node.

10. The method according to claim 6, wherein the first configuration information comprises at least one of the following information: parameter information of the first slot, DMRS configuration type information of the first slot, a code division multiplexing (CDM) group identifier, or an orthogonal cover code (OCC) identifier.

11. A communications apparatus, comprising a processor and a transceiver, wherein
the transceiver receives first configuration information sent by a second node, wherein the second node is a parent node of the communications apparatus; and
the processor determines, based on the first configuration information, a second resource for communication between the communications apparatus and a child node served by the communications apparatus, wherein the second resource is at least one demodulation reference signal (DMRS) port that can be occupied by a first access link, the at least one DMRS port is one of a plurality of ports in a DMRS port set corresponding to a first slot, and the first access link is a link between the communications apparatus and the child node served by the communications apparatus,
wherein the communications apparatus uses a space division multiple access (SDMA) technology that is based on flexible duplex.

12. The apparatus according to claim 11, wherein the first configuration information is used to indicate a third resource that can be used by the first access link, the third resource is one of the plurality of ports in the DMRS port set, and the second resource is all or a part of resources of the third resource.

13. The apparatus according to claim 11, wherein the first configuration information is used to indicate a fourth resource occupied by a backhaul link between the communications apparatus and the second node, the fourth resource is one of the plurality of ports in the DMRS port set, and the second resource is one or more or all of the plurality of ports, other than the fourth resource, in the DMRS port set.

14. The apparatus according to claim 11, wherein the first slot is one of a plurality of slots that are used for spatial multiplexing and that are configured by the second node for a backhaul link between the communications apparatus and the second node, and a slot used for spatial multiplexing is one of the plurality of slots in which data sending or receiving can be simultaneously performed on a backhaul link and an access link of a same node.

15. The apparatus according to claim 11, wherein the first configuration information comprises at least one of the following information: parameter information of the first slot, DMRS configuration type information of the first slot, a code division multiplexing (CDM) group identifier, or an orthogonal cover code (OCC) identifier.

16. A communications apparatus, comprising a processor and a transceiver, wherein
the processor determines first configuration information, wherein the first configuration information is used by a first node to determine, based on the first configuration information, a second resource for communication between the first node and a child node served by the first node, the second resource is at least one demodulation reference signal (DMRS) port that can be occupied by a first access link, the at least one DMRS port is one of a plurality of ports in a DMRS port set corresponding to a first slot, and the first access link is a link between the first node and the child node served by the first node; and
the transceiver sends the first configuration information to the first node under control of the processor,
wherein the first node uses a space division multiple access (SDMA) technology that is based on flexible duplex.

17. The apparatus according to claim 16, wherein the first configuration information is used to indicate a third resource that is not occupied by a backhaul link between the first node and the communications apparatus, the third resource is one of the plurality of ports in the DMRS port set, and the second resource is all or a part of resources of the third resource.

18. The apparatus according to claim 16, wherein the first configuration information is used to indicate a fourth resource that can be used by the first access link, the fourth resource is one of the plurality of ports in the DMRS port set, and the second resource is one or more or all of the plurality of ports, other than the fourth resource, in the DMRS port set.

19. The apparatus according to claim 16, wherein the first slot is one of a plurality of slots that are used for spatial multiplexing and that are configured by the communications apparatus for a backhaul link between the first node and the communications apparatus, and a slot used for spatial multiplexing is one of the plurality of slots in which data sending or receiving can be simultaneously performed on a backhaul link and an access link of a same node.

20. The apparatus according to claim 16, wherein the first configuration information comprises at least one of the following information: parameter information of the first slot, DMRS configuration type information of the first slot, a code division multiplexing (CDM) group identifier, or an orthogonal cover code (OCC) identifier.

* * * * *